US009648507B2

(12) United States Patent
Keisala

(10) Patent No.: US 9,648,507 B2
(45) Date of Patent: May 9, 2017

(54) OPTIMIZATION OF NETWORK RESOURCE UTILIZATION

(71) Applicant: TeliaSonera AB, Stockholm (SE)

(72) Inventor: Ilkka Keisala, Espoo (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 14/732,193

(22) Filed: Jun. 5, 2015

(65) Prior Publication Data
US 2015/0358835 A1 Dec. 10, 2015

(30) Foreign Application Priority Data
Jun. 5, 2014 (EP) .................................... 14171276

(51) Int. Cl.
H04W 24/02 (2009.01)
H04W 52/02 (2009.01)
H04W 4/00 (2009.01)
H04W 60/00 (2009.01)

(52) U.S. Cl.
CPC ........... *H04W 24/02* (2013.01); *H04W 4/005* (2013.01); *H04W 52/028* (2013.01); *H04W 60/00* (2013.01)

(58) Field of Classification Search
CPC ..... H04W 24/02; H04W 60/00; H04W 4/005; H04W 52/028; H04W 60/04; H04W 48/18; H04W 76/027; H04W 60/02; H04W 60/005
See application file for complete search history.

(56) References Cited

U.S. PATENT DOCUMENTS

| 4,972,355 | A | 11/1990 | Mullins |
| 8,380,166 | B2 | 2/2013 | Diebold et al. |
| 2012/0178449 | A1* | 7/2012 | Liao ...................... H04W 60/00 455/435.2 |
| 2013/0329638 | A1 | 12/2013 | Ren et al. |

FOREIGN PATENT DOCUMENTS

| EP | 1633115 A1 | 3/2006 |
| EP | 2475213 A2 | 7/2012 |
| WO | 9929134 A1 | 6/1999 |
| WO | 2006031898 A2 | 3/2006 |

OTHER PUBLICATIONS

European Search Report dated Nov. 5, 2014 from corresponding to European application.
"Keeping Ongoing realtime and multimedia services if IMS VoPS change for a CS/PS mode 1 UE registered for EPS services only"; 3GPP TSG-CT WG1 Meeting #86; Rev. 8 of Version 12.3.0; Guangzhou, P.R. of China, Jan. 20-24, 2014; pp. 1-20.

* cited by examiner

Primary Examiner — Chuong A Ngo
(74) Attorney, Agent, or Firm — Young & Thompson

(57) ABSTRACT

Disclosed is a method for optimizing signaling in a mobile communication network, wherein a terminal devices equipped with a subscription is attempting to register to the mobile communication network. The method includes detecting an indication on an unsuccessful registering attempt; updating a counter value maintained for the subscription, the counter value indicating a number of the unsuccessful registering attempts; comparing the updated counter value with a predetermined maximum counter value; and if the updated counter value meets the predetermined maximum counter value instructing to disable a radio communication of the terminal device. Also disclosed are a terminal device computer program code and a subscription.

16 Claims, 2 Drawing Sheets

OPTIMIZATION OF NETWORK RESOURCE UTILIZATION

TECHNICAL FIELD

The invention concerns in general the technical field of telecommunications. Especially the invention concerns optimization of network resource utilization.

BACKGROUND

The development in telecommunications area has caused that there are more and more subscriber connections i.e. subscriptions existing in mobile communications networks. One reason for the increase of subscriptions within the networks is that more and more devices, or machines, are arranged to communicate with each other. This concept is known with a term Machine-to-Machine, or M2M, communication. More specifically, M2M concept may be described so that machines use network resources to communicate with remote application infrastructure for the purposes of monitoring and control, either of the "machine" itself, or the surrounding environment. Naturally it is so that each device being involved in the M2M communication shall be equipped with necessary hardware enabling the communication and comprise a necessary subscription in order to have access to utilizing the telecommunication network resources in question. The subscription refers to a Universal Integrated Circuit Card, UICC, which is an integrated circuit element that securely stores the international mobile subscriber identity (IMSI) and the related key used to identify and authenticate subscribers of mobile communication devices within a mobile communication network. In general, the subscription is known with a term Subscriber Identity Module, SIM, especially in 2G mobile communication systems and Universal Subscriber Identity Module, USIM, in 3G mobile communication systems. So called embedded UICC is the latest development within the era wherein the functionalities of UICC is brought to a device in an embedded solution and not as a separate functional entity.

The increase of subscriptions within telecommunication networks has caused side effects, which are not desirable. Namely, each subscription, when coupled to a communication terminal with enabled radio part, produces signaling traffic in the network. This is even true when the subscription itself is inactivated i.e. the subscription does not have access right in using the network resources. In such a situation the subscription initiates an access attempt(s) towards the network, but the network does not provide the access when noticing that the subscription is not set active within the network. By taking into account the increase of subscriptions in a network, e.g. at least partly due to M2M development, the described access attempt procedure accumulates a lot unwanted utilization of network resources in the network in question.

Thus, there is need to develop solution, which mitigates the challenge as described above and which optimizes the utilization of network resources.

SUMMARY

An objective of the invention is to present a method, a terminal device, a computer program code and a subscription for optimizing an amount of traffic between the terminal device and a mobile communication network. Another objective of the invention is that the method, the terminal device, the computer program code and the subscription implements a logic which optimize radio communication in a context of network registration.

The objects of the invention are reached by a method, a terminal device and a computer program code as defined by the respective independent claims.

According to a first aspect, a method for optimizing signaling in a mobile communication network is provided, wherein one or more terminal devices equipped with a subscription is attempting to register to the mobile communication network, the method comprises detecting an indication on an unsuccessful registering attempt; updating a counter value maintained for the subscription, the counter value indicating a number of the unsuccessful registering attempts; comparing the updated counter value with a predetermined maximum counter value; and if the updated counter value meets the predetermined maximum counter value instructing to disable a radio communication of the terminal device.

The method may further comprise setting a period of time to maintain the radio communication of the terminal device in a disabled state. The period of time may be set on a basis of one of the following: at least one predetermined value stored in the terminal device, receipt of information from a network. Moreover, the period of time set for maintaining the radio communication of the terminal device in a disabled state may be dependent on an order of such a state.

The radio communication may be disabled in at least one of the following manner: turning off the radio part of the terminal device, turning off the terminal device, setting a predetermined mode within the terminal device.

According to a second aspect, a terminal device equipped with a subscription is provided wherein the terminal device comprising a processing unit with at least one processor and a memory unit with at least one memory including computer program code, the at least one memory and the computer program code configured to, with the at least one processor, cause the terminal device at least to detect an indication on an unsuccessful registering attempt; update a counter value maintained for the subscription, the counter value indicating a number of the unsuccessful registering attempts; compare the updated counter value with a predetermined maximum counter value; and if the updated counter value meets the predetermined maximum counter value instruct to disable a radio communication of the terminal device.

The terminal device may further be configured to set a period of time to maintain the radio communication of the terminal device in a disabled state. The period of time may be set on a basis of one of the following: at least one predetermined value stored in a memory of the terminal device, receipt of information from a network. Moreover, the period of time set for maintaining the radio communication of the terminal device in a disabled state may be dependent on an order of such a state.

The terminal device may be configured to disable the radio communication in at least one of the following manner: turning off the radio part of the terminal device, turning off the terminal device, setting a predetermined mode within the terminal device.

According to a third aspect, a computer program code is provided which comprises one or more sequences of one or more instructions which, when executed by one or more processors, cause a terminal device to at least perform the method according to the first aspect of the invention.

According to fourth aspect, a subscription comprising a memory is provided, wherein a computer program code according to the third aspect is stored in in the memory of the subscription.

The exemplary embodiments of the invention presented in this patent application are not to be interpreted to pose limitations to the applicability of the appended claims. The verb "to comprise" is used in this patent application as an open limitation that does not exclude the existence of also un-recited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF DRAWINGS

The embodiments of the invention are illustrated by way of example, and not by way of limitation, in the figures of the accompanying drawings.

DETAILED DESCRIPTION

Figure 1:
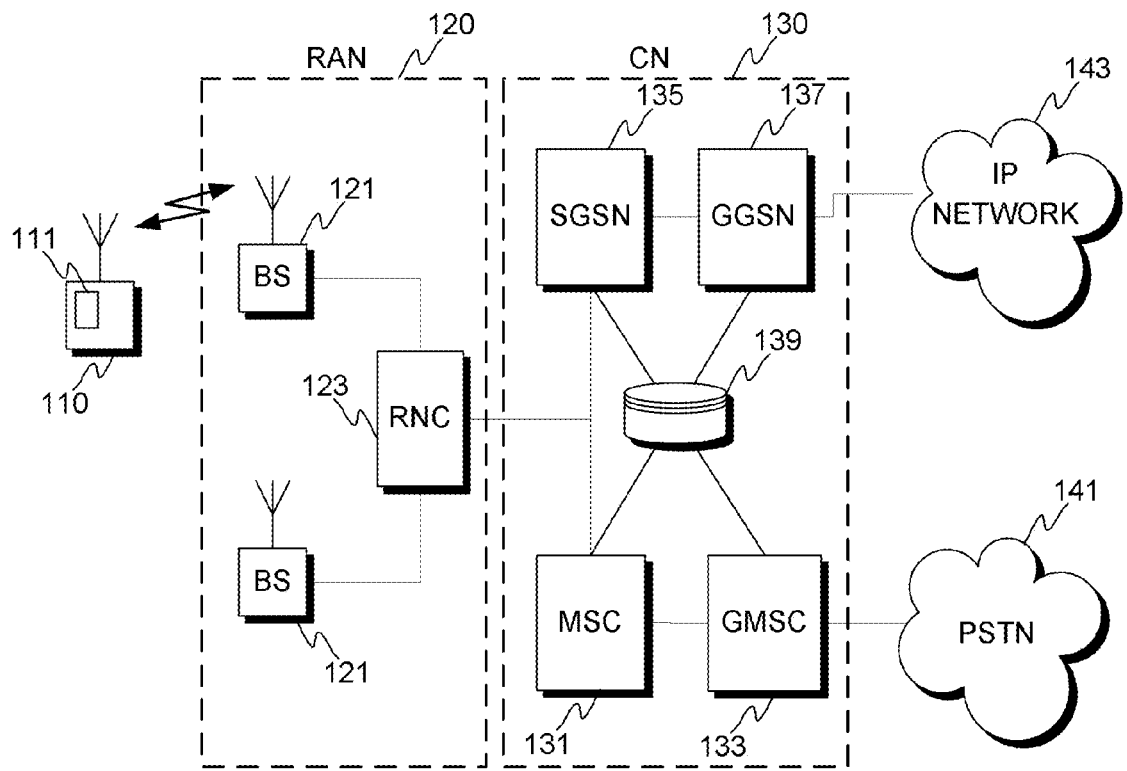
FIG. 1 illustrates an example of an environment wherein the solution according to the present invention may be implemented.

FIG. 1 illustrates an example of an environment in which a solution according to the present invention may be implemented. For clarity reason only one terminal device is disclosed in FIG. 1. The terminal device 110 is arranged to communicate wirelessly towards the mobile communication network. The terminal device 110, such as M2M device, comprises necessary hardware and software elements to implement the communication interface in question. A subscription 111 i.e. UICC element is arranged, or implemented, in the terminal device 110. The mobile communication network is typically described to consist of two entities— from a radio access network, RAN, 120 and from a core network, CN, 130. The radio access network 120 implements the wireless communication towards the terminal device 110 and provides the terminal device 110 a connection to core network 130. The core network 130 is a central part of telecommunication network in providing the services to subscribers, who are connected to the radio access network. The services provided by the core network may be, but are not limited to, authentication, call control and switching, charging and so on.

FIG. 1 discloses at least some main elements within the radio access network 120 and core network 130. The main elements in the radio access network 120 may be, but are not limited to, base stations 121 and radio network controller 123 controlling the traffic between the base stations and core network 130. The main elements in the core network 130 may be, but are not limited to, mobile switching center 131 and/or gateway mobile switching center 133, which are configured to manage and control circuit switched domain. As regards the packet switched domain the main elements may be, but are not limited to, a serving GPRS support node, SGSN, 135, Gateway GPRS support node, GGSN, 137 and Mobility Management Entity, MME (not disclosed in FIG. 1). The GMSC and GGSN may provide gateways to corresponding networks, such as circuit switched network 141, like PSTN, and packet based network 143, like IP network such as Internet. In addition to the mentioned elements the core network comprises one or more registers 139, such as HLR/VLR or HSS, which are configured to store and manage user-related and subscription-related information. The mentioned elements in the radio access network 120 and in the core network 130 are examples mainly from 3G mobile communication network, but the invention is also applicable in other networks implementing different communication technology.

Figure 2:
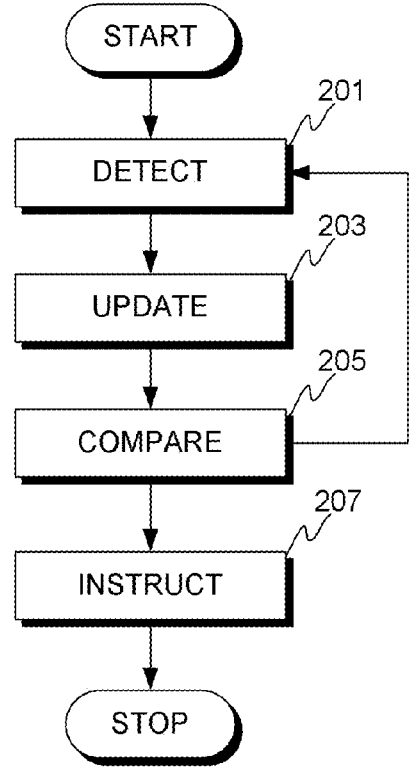
FIG. 2 illustrates an example of the method according to the invention.

FIG. 2 discloses an example of the method according to the invention. Within the method it is arranged a detection 201 of registration attempts of a subscription 111 to the network with a monitoring such a procedure. More specifically, it may be arranged that unsuccessful registration attempts are detected. If an unsuccessful registration attempt is detected, a counter value representing unsuccessful registration attempts of the subscription 111 is updated 203, e.g. added with one. In the next phase it is compared 205 if the updated counter value meets a predetermined value set for the subscription 111. For example, the predetermined value may be three. If the predetermined value is not met, the detection 201 may be continued (arrow on the right in FIG. 2). If the comparison 205 indicates that the predetermined value is met, an instruction is generated and delivered 207 so that registration attempts are restricted. The restriction instruction may e.g. be that a utilization of radio interface of the terminal device is disabled for the registration attempt. In its simplest form the instruction is configured to disable the radio part of the terminal device 110. Disabling the radio part may also be achieved by setting the terminal device 110 into a predetermined mode, such as a flight mode, in order to prevent any radio traffic from and to the terminal device 110. According to another implementation of the invention the instruction may be configured to switch off the terminal device. The principal idea in any of the mentioned methods to disable the registration attempt is that any radio communication is prevented, or disabled, from the terminal device 110 for at least some period of time.

According to an example of the invention the method as described above may be implemented in the terminal device 110. The implementation may be arranged with a configurable logic in the terminal device 110, which is arranged to monitor any registration attempts originating from the subscription 111 of the terminal device 110 into which a cancellation is received from the network side. The detection of unsuccessful registration attempt may e.g. be based on the signaling from the network indicating that the subscriber's access to the network is rejected. Moreover, the logic may comprise an implementation, such as a counter, in which it is maintained information on the number of unsuccessful registration attempts to the network, which counter information is updated accordingly when the unsuccessful registration attempt is detected. Moreover, the logic comprises a comparison function wherein the value in the counter is compared with a predetermined value stored in the terminal device 110 retrievable by the logic. The logic is configured to continue monitoring if the counter value does not meet the predetermined value. In case the predetermined value is met, the logic is configured to establish an instruction and by delivering the instruction message to a radio part in the terminal device 110 the logic disables any registration attempts by the subscription towards the network. According to another implementation of the invention the instruction message may comprise an instruction to switch off the terminal device 110. In such a case the logic may comprise an internal timer running within the terminal device 110 even if the terminal device 110 is turned off. When the period of time set in the timer has passed, the logic is configured to turn on the terminal device 110 in order to re-initiate the registration attempt as described.

In the previous description the idea is that the radio communication of the terminal device 110 is disabled for a certain period of time if a predetermined limit set for registration attempts is reached. According to a further implementation of the invention it may be arranged that the first period of time set for the disabling the radio communication differs from a second period of time set for the second disabling the radio communication, and so on. With such an arrangement it is possible to optimize the utilization of network resources even more. Naturally, this kind of arrangement requires that a further logic is arranged within the terminal device 110 which is configured to monitor and maintain information on how many times the radio communication has been disabled. Furthermore, the logic comprises information on periods of time defined for each occasions, i.e. order, of disabled radio communication. For example, the first period of time of disabling may be one week, second period of time of disabling may be two weeks, and so on.

Figure 3:
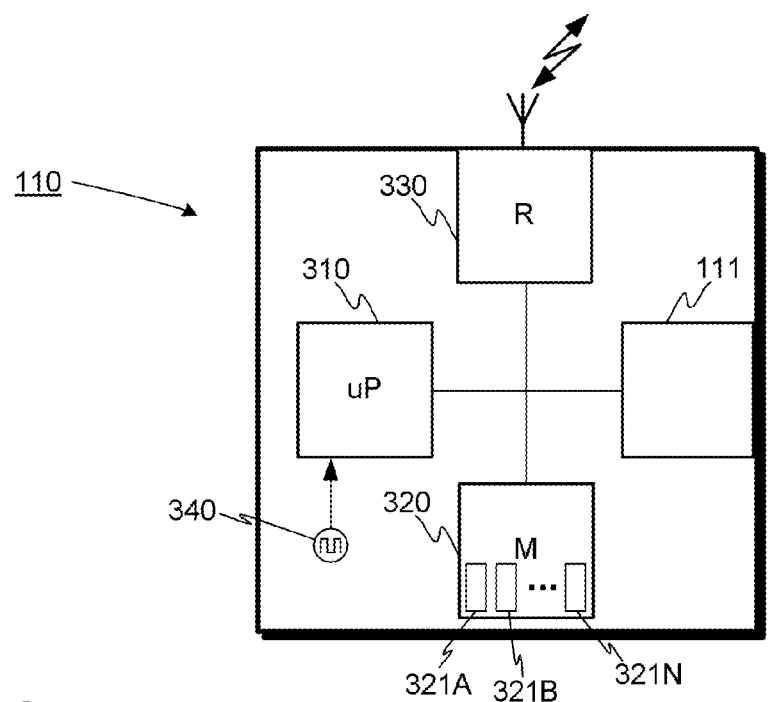
FIG. 3 illustrates an example of a terminal device implementing at least part of the present invention.

FIG. 3 illustrates, as an example, a terminal device 110 into which the logic, as described above, may be arranged. Only the relevant parts in view of the invention are disclosed. The terminal device 110 comprises a processing unit 310 comprising one or more processors, memory unit 320 comprising one or more memory elements and a radio part 330. The memory unit 320 is configured to store portions of computer program code 321A-321N, which store instructions to implement the described logic when at least some of the portions of computer program code 321A-321N are executed by the processing unit 310. Additionally, the memory unit 320 may be configured to store the predetermined maximum counter value to be used in the comparison as described. Thus, as an end result if the predetermined condition is fulfilled the radio part 330 is disabled. Alternatively or in addition, the memory unit 320 may comprise a value for a timer defining a period of time for keeping the terminal device in a turned off mode. Namely, if the message instructs the terminal to turn off, the processing unit 310 may be configured to initiate a timer starting with a value predetermined in the memory unit 320 and in response to running out of the predetermined period of time, the processing unit may be configured to turn on the device for further registration attempts. Moreover, the subscription 111, such as UICC, is arranged within the terminal device 110, which is configured to, together with other parts of the terminal device 110, to initiate the registration towards the network. In other words, the processing unit 310 and the UICC 111 may be arranged to cooperate with the radio part 330 in order to possibly detect the mentioned kinds of triggering events in order to enable the utilization of the present invention.

According to another example of the invention the method as described may be implemented in the mobile communication network into which the subscription belongs to. A network element, such as a MSC 131 or SGSN 135 may be arranged to monitor unsuccessful registration attempts of subscriptions belonging under management of the network element. The network element may be configured to maintain a counter describing a number of unsuccessful registration attempts, which is updated when such a registration attempt is detected by the network element. Moreover, the network element is configured to store, or to have an access to, information disclosing a maximum number of unsuccessful registration attempts allowed for a subscription. The information may be stored in a memory of the network element, or even more preferably in a register 139 storing information on subscriptions into which the network element may initiate queries e.g. according to specifications. The updated value of the counter is arranged to be compared with the maximum number of unsuccessful registration attempts and if the maximum number of unsuccessful registration attempts is met, the network element is configured to compose and deliver an instruction message, e.g. through signaling, that the delivery of registration attempts from the terminal device 110 is restricted. The restriction may e.g. be achieved with a signaling disabling the radio in the terminal device 110.

According to some further example of the invention it may be arranged that the disabling of the radio part in the terminal device 110 is a predetermined period of time. This is because it may be advantageous to allow additional registration attempts after the predetermined period of time. The telecom operator managing the subscription may e.g. reactivate the subscription during the period of time and thus the terminal device may initiate together with the subscription the registration attempt towards the network resulting a successful access to the network. The predetermined period of time for disabling of the radio part in the terminal device 110 may be stored in the memory unit of the terminal device 110. The period of time may be individually set for each subscription or given as a default value to all subscriptions. Moreover, the period of time may be reconfigured through configuration settings, for example. Additionally, the logic within the terminal device 110 is configured to receive a clock signal as an input and the logic is configured to run a timer. The timer value is thus compared to the predetermined period of time set for the disabling the radio part and when the predetermined period of time is met, the logic is configured to establish an instruction and signal it to the radio part to enabling again the radio part in the terminal device. In FIG. 3 the terminal device 110 comprises an internal clock circuit 340 for providing the clock signal in the logic. Alternatively to storing a default value for the mentioned predetermined period of time the network may deliver a value for the period of time either independently to the registration attempt or in response to the registration attempt. Such an implementation provides an opportunity to adjust the period of time optimally from the network point of view.

Figure 4:
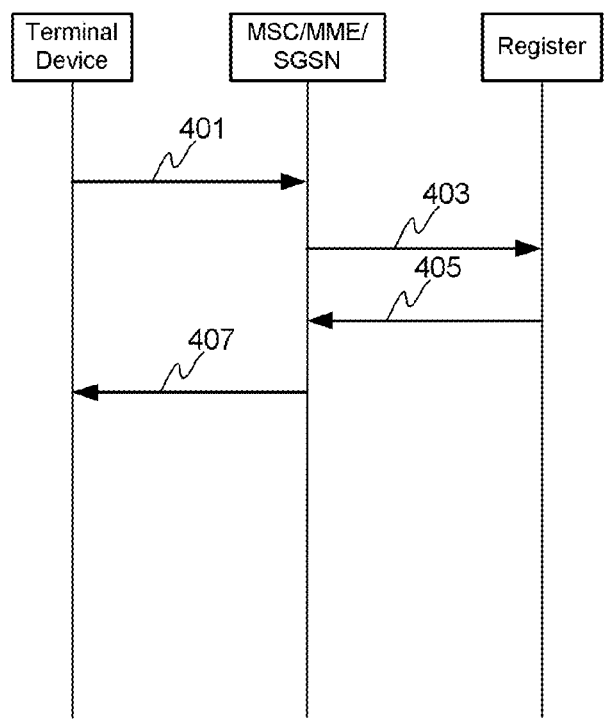
FIG. 4 illustrates an example of a signaling according to the present invention.

Next it is described in a more detailed manner the communication between the terminal device and the network on a basis of which the registration attempt may be judged to be unsuccessful by referring to FIG. 4. Herein it is assumed that the terminal device is equipped with a subscription 111, such as UICC, either by a physical integrated circuit card or by an embedded solution. The subscription is granted by, and thus belongs to, a certain mobile communication network. FIG. 4 discloses only the relevant elements in order to describe some aspects of the invention. In the initial phase the terminal device 110 generates a registration request 401 towards to a network wherein at least an identity of the subscription is delivered to a network element, such as MSC, MME or SGSN. The request is herein considered as a registration attempt to the network. In response to a receipt of the registration request the network element initiates a query 403 towards a register, such as HLR or VLR, which register stores information on the subscription. The query comprises the identity of the subscription requesting the registration to the network. The register is configured to respond to the query with an indication disclosing the status of the subscription, e.g. if the subscription is valid or not. In both cases the network element responds 407 to the terminal device 110. If the subscription is valid and thus active, the response 407 informs on a successful registration. If the subscription is not valid, the response 407 indicates on unsuccessful registration. In the case of a delivery of the unsuccessful registration response 407 the counter value is updated as described in the terminal device 110 or in the network or in both. The registration message 401 may be, but is not limited to, a subscription attachment request, such as IMSI attach. In some implementation of the invention, the unsuccessful registration response 407 may comprise information relating to the period of time defining the period how long the radio communication is disabled by the terminal device. Such piece of information may be delivered by the network even if the logic is arranged in the terminal device. 110.

The terminal device 110 may be a terminal dedicated to M2M communication equipped with a subscription, such as integrated circuit element like UICC card. In order to initiate M2M communication the subscription shall be registered to the network. The present invention provides a solution for reducing signaling in the network due to deactivated subscriptions causing unnecessary signaling in the network. The invention is not limited to M2M communication only, but may be applied in any similar environment within the limits set by the claims attached hereto.

In the description above it is described that the mentioned logic and necessary parameters thereto, such as counter value, is stored in the terminal device 110, and more specifically in the memory unit 320 of the terminal device 110. However, the mentioned logic, implemented e.g. with a computer program code comprising one or more sequences of one or more instructions to be executed with the processing unit 310, may also be stored in one or more memory elements residing in the subscription 111, such as in the UICC. In such a case the processing unit 310 is configured to access the computer program code residing in memory elements of the subscription 111 and execute at least one portion of the computer program code in order to achieve the execution of the logic as described.

Some advantageous embodiments according to the invention were described above. The invention is not limited to the embodiments described. The inventive idea can be applied in numerous ways within the scope defined by the claims attached hereto.

The invention claimed is:

1. A method for optimizing signaling in a mobile communication network, wherein one or more terminal devices equipped with a subscription is attempting to register to the mobile communication network, the method comprising:
   detecting an indication on an unsuccessful registering attempt,
   updating a counter value maintained for the subscription, the counter value indicating a number of the unsuccessful registering attempts,
   comparing the updated counter value with a predetermined maximum counter value,
   when the updated counter value meets the predetermined maximum counter value instructing to disable a radio communication of the terminal device for a period of time defined by the mobile communication network, wherein the period of time is delivered in an instruction message to the terminal device as a value to be input to a timer implemented in the terminal device, and
   in response to a lapse of the period of time, initiating a registration attempt to the mobile communication network by re-enabling the radio communication of the terminal device.

2. The method according to claim 1, wherein the period of time set for maintaining the radio communication of the terminal device in a disabled state is dependent on an order of such a state.

3. The method according to claim 2, wherein the radio communication is disabled in at least one of the following manner: turning off the radio part of the terminal device, turning off the terminal device, setting a predetermined mode within the terminal device.

4. A non-transitory computer-readable medium having one or more sequences of one or more instructions which, when executed by one or more processors, cause a terminal device to at least perform the method according to claim 2.

5. The method according to claim 1, wherein the radio communication is disabled in at least one of the following manner: turning off the radio part of the terminal device, turning off the terminal device, setting a predetermined mode within the terminal device.

6. The method according to claim 5, wherein the period of time set for maintaining the radio communication of the terminal device in a disabled state is dependent on an order of such a state.

7. A non-transitory computer-readable medium having one or more sequences of one or more instructions which, when executed by one or more processors, cause a terminal device to at least perform the method according to claim 5.

8. A non-transitory computer-readable medium storing one or more sequences of one or more instructions which, when executed by one or more processors, cause a terminal device to at least perform the method according to claim 1.

9. A subscription comprising a memory storing one or more sequences of one or more instructions which, when executed by one or more processors cause the performance of the method according to claim 1.

10. The method according to claim 1, wherein the radio communication is disabled in at least one of the following manner: turning off the radio part of the terminal device, turning off the terminal device, setting a predetermined mode within the terminal device.

11. A subscription comprising a non-transitory computer-readable memory storing one or more sequences of one or more instructions which, when executed by one or more processors cause the performance of the method according to claim 1.

12. A terminal device equipped with a subscription, the terminal device comprising a processing unit with at least one processor and a memory unit with at least one memory including computer program code, the at least one memory and the computer program code configured to, with the at least one processor, cause the terminal device at least to:
   detect an indication on an unsuccessful registering attempt,
   update a counter value maintained for the subscription, the counter value indicating a number of the unsuccessful registering attempts,
   compare the updated counter value with a predetermined maximum counter value,
   when the updated counter value meets the predetermined maximum counter value instruct to disable a radio communication of the terminal device for a period of time defined by the mobile communication network, wherein the period of time is delivered in an instruction message to the terminal device as a value to be input to a timer implemented in the terminal device, and in response to a lapse of the period of time, initiating a registration attempt to the mobile communication network by re-enabling the radio communication of the terminal device.

13. The terminal device according to claim 12, wherein the period of time set for maintaining the radio communication of the terminal device in a disabled state is dependent on an order of such a state.

14. The terminal device according to claim 13, wherein the terminal device is configured to disable the radio communication in at least one of the following manner: turning off the radio part of the terminal device, turning off the terminal device, setting a predetermined mode within the terminal device.

15. The terminal device according to claim 12, wherein the terminal device is configured to disable the radio communication in at least one of the following manner: turning off the radio part of the terminal device, turning off the terminal device, setting a predetermined mode within the terminal device.

16. The terminal device according to claim 15, wherein the period of time set for maintaining the radio communication of the terminal device in a disabled state is dependent on an order of such a state.

* * * * *